(12) United States Patent
Winslow

(10) Patent No.: US 7,236,970 B1
(45) Date of Patent: Jun. 26, 2007

(54) ADDRESS MATCHING SYSTEM AND METHOD

(75) Inventor: Richard Baker Winslow, Culver City, CA (US)

(73) Assignee: Stamps.Com, Santa Monica, CA (US)

( * ) Notice: Subject to any disclaimer, the term of this patent is extended or adjusted under 35 U.S.C. 154(b) by 0 days.

(21) Appl. No.: 09/692,031

(22) Filed: Oct. 19, 2000

Related U.S. Application Data

(60) Provisional application No. 60/154,523, filed on Oct. 19, 1999.

(51) Int. Cl.
*G06F 7/00* (2006.01)

(52) U.S. Cl. .................. 707/3; 707/1; 707/2; 707/5; 707/10; 705/60

(58) Field of Classification Search .............. 707/3–5, 707/10, 103 R–103 Z, 101, 102; 705/60
See application file for complete search history.

(56) References Cited

U.S. PATENT DOCUMENTS

| | | | |
|---|---|---|---|
| 5,341,505 A | | 8/1994 | Whitehouse |
| 5,454,038 A | | 9/1995 | Cordery et al. |
| 5,590,198 A | * | 12/1996 | Lee et al. .............. 705/61 |
| 5,754,306 A | | 5/1998 | Taylor et al. ............ 358/400 |
| 5,781,634 A | | 7/1998 | Cordery et al. |
| 5,819,282 A | * | 10/1998 | Hooper et al. .......... 707/103 |
| 5,930,796 A | * | 7/1999 | Pierce et al. ............ 707/100 |
| 5,966,714 A | | 10/1999 | Huang et al. ............ 707/201 |
| 6,148,289 A | * | 11/2000 | Virdy .................... 705/1 |
| 6,324,538 B1 | * | 11/2001 | Wesinger, Jr. et al. ...... 707/10 |
| 6,418,413 B2 | * | 7/2002 | DeMarcken et al. ....... 705/5 |
| 6,457,012 B1 | * | 9/2002 | Jatkowski ............... 707/101 |
| 6,701,352 B1 | * | 3/2004 | Gardner et al. .......... 709/218 |

FOREIGN PATENT DOCUMENTS

| | | |
|---|---|---|
| EP | 0 507 562 A2 | 10/1992 |
| EP | 0 663 652 | 7/1995 |
| EP | 0 854 448 | 7/1998 |
| EP | 0 944 027 | 9/1999 |
| WO | WO98/57302 | 12/1998 |
| WO | WO99/48054 | 9/1999 |

OTHER PUBLICATIONS

Wolfgang Baudisch, Browser Cache Switch (BCS) for Internet Explorer, copyright 1999 <http://www.wbaudisch.de/BCS.htm>.*
Scott Martin, The Ultimates, copyright 1998, <http://web.archive.org/web/19981212033424/http://www.theultimates.com/>.*

* cited by examiner

*Primary Examiner*—Hung Q. Pham
(74) *Attorney, Agent, or Firm*—Christie, Parker & Hale, LLP.

(57) ABSTRACT

An address matching system that maintains a central database of valid addresses has been designed. According to the invention, address matching requests are received by the system from a plurality of remote users located at respective machines ("clients"). Those requests are processed at the central system, and the results are returned to the client that made the request. In addition, novel techniques are implemented for improving the likelihood of obtaining one or more matches from a request.

11 Claims, 11 Drawing Sheets

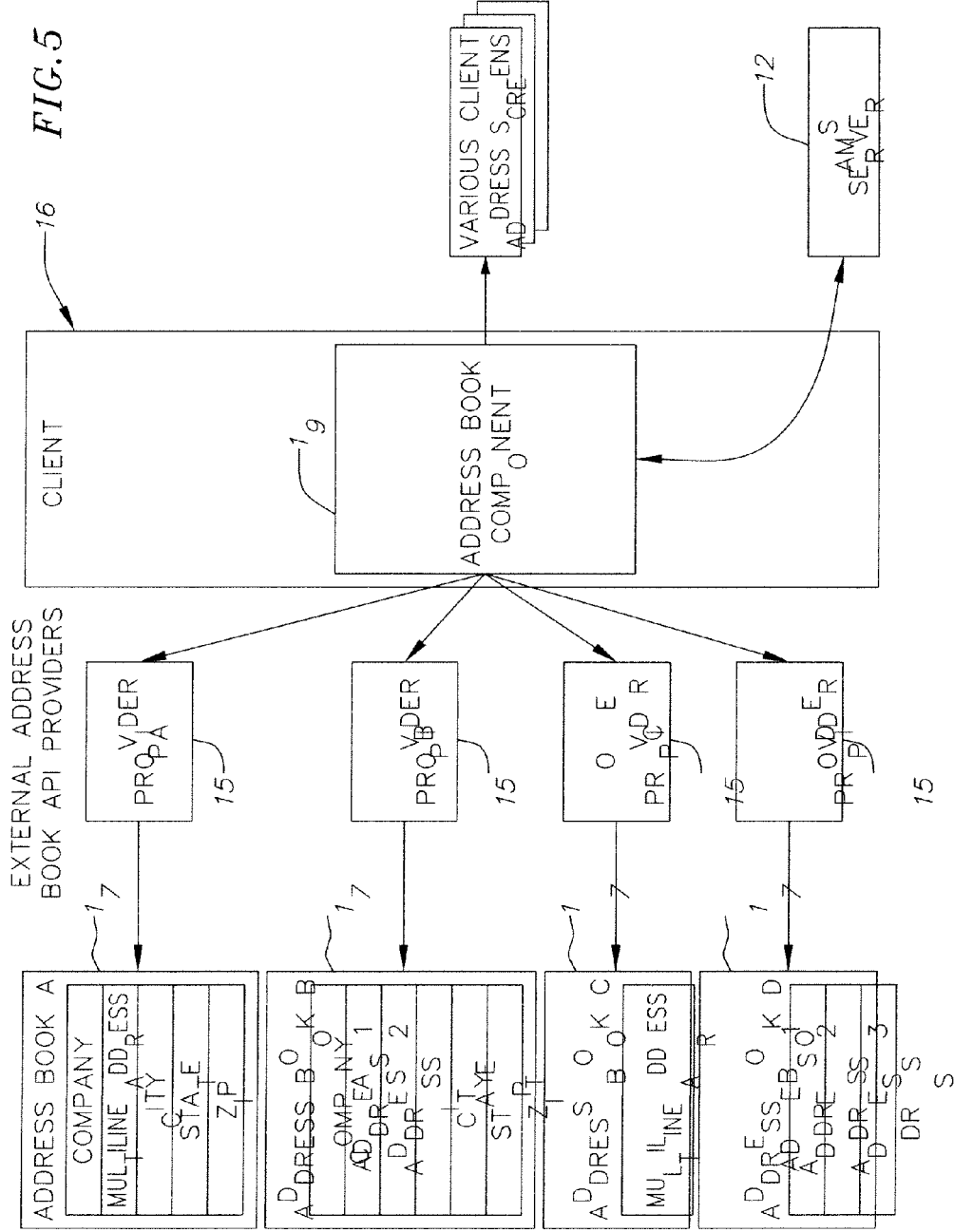

FIG. 6

| Canonical Field Name | Note |
|---|---|
| None | |
| DisplayName | |
| Full Name | Mutually exclusive with [NamePrefix, NameSuffix]. |
| NamePrefix | Mr., Ms., etc. |
| FirstName | |
| MiddleName | |
| LastName | |
| NameSuffix | Jr., M.D., etc. |
| Title | Corresponds to USPS Pub 28's "FUNCTIONAL TITLE". |
| Department | |
| Company | |
| MutilineAddress | Mutually exclusive with [Address1-3, Unit]. |
| Address1 | |
| Address2 | |
| Address3 | |
| UnitName | Apt, Suite, etc. Cannot exist if Unit doesn't exist. |
| Unit | Can exist only when Address1 is present but no Address2 or Address3. |
| City | |
| Sate | |
| Zip | 5-digit or 9-digit ZIP code if there is no ZipAddOn field. |
| ZipAddon | 4-digit extension to the 5-digit ZIP code. |
| Country | |
| DPB | Delivery Point Barcode. Must be a 2 or 3 digit number. |
| CheckDigit | Must be a 1 digit number. |
| Mailstop | A USPS code. |
| Route | A USPS code. |
| Cargo | Non-user-visible BLOB that Stamps.com can "own". |

ADDRESS MATCHING SYSTEM AND METHOD

CROSS-REFERENCE TO RELATED APPLICATIONS

This patent application claims the benefit of the filing date of U.S. Provisional Patent Application Ser. No. 60/154,523, filed Oct. 19, 1999 and entitled "USER ADMINISTRATION FOR ON-LINE POSTAGE SYSTEM", the entire contents of which is hereby expressly incorporated by reference.

FIELD OF THE INVENTION

The present invention relates to secure printing of value-bearing items (VBI), such as postage for letters and other items to be delivered by the United States Postal Service (USPS) More specifically, the invention relates to a system and method for validating addresses using a central address matching database, with such address matching being conducted over a communications network.

BACKGROUND OF THE INVENTION

A significant percentage of the United States Postal Service (USPS) revenue is from metered postage. Metered postage is generated by utilizing postage meters that print a special mark, also known as postal indicia, on mail pieces. Generally, printing postage and any other VBI can be carried out by using mechanical meters or computer-based systems. Conventionally, a business or other entity will have a meter at its place of business, and will use the meter to print postal indicia on mail pieces or on labels that are then affixed to the mail pieces.

With respect to computer-based postage processing systems, the USPS, under the Information-Based Indicia Program (IBIP), has published specifications for IBIP postage meters that identify a Postal Security Device (PSD). The PSD, in conjunction with the user's personal computer and printer, functions as the IBIP postage meter. The USPS has published a number of documents describing the PSD specifications, the indicia specifications and other related and relevant information. There are also security standards for printing other types of VBI, such as coupons, tickets, gift certificates, currency, vouchers, and the like.

One of the standards required by the USPS is that the address of the intended recipient of a piece of mail be verified by comparing the entered address with a database of valid addresses provided by the USPS. Conventionally, this requires that the sender have the database installed on their local computer and compare the intended destination address with the addresses in the database. Moreover, when the USPS provides a new release of addresses, each sender is required to obtain the updated database to continue to validate addresses. Thus, such a system can be burdensome to its users.

In addition, since addresses vary widely in terms of number of elements in the address and various address formats, address matching can be a difficult undertaking, even with a current list of all valid addresses available to the sender.

Therefore, it would be desirable to have a method and system for performing address matching from a single, central location, thereby doing away with the need for each remote user to maintain an updated database of valid addresses. In addition, it would be desirable to have such a system and method that allows addresses to be validated once from a particular sender, such that when the sender desires to use a previously validated address again, there is no need to perform address matching a second time. Moreover, it would be desirable to have a method and system that takes a desired address and manipulates the format into multiple structures before comparing the address with a set of valid addresses in order to increase the likelihood of obtaining a match. The present invention addresses these desirable features.

SUMMARY OF THE INVENTION

In accordance with one aspect of the present invention, an address matching system that maintains a central database of valid addresses has been designed. According to the invention, address matching requests are received by the system from a plurality of remote users via respective devices ("clients"). Those requests are processed at the central system, and the results are returned to the client that made the request.

In one embodiment, the central system, in cooperation with the client, utilizes novel address matching techniques to increase the likelihood of finding a match for a received address. Preferably, the invention utilizes one or more query permuters to arrange the address data in different formats in an effort to increase the likelihood of finding a match for a particular address.

In another aspect, the invention describes a method for matching an address entered by a user with a database of valid addresses, comprising: receiving the address from a source; accessing a database that contains one or more valid addresses; comparing the address from the user with the database of valid addresses; and storing information relating to the address in a companion file if a match is found.

In yet another embodiment, the invention is directed to a method for validating an address, comprising: receiving the address from a source, accessing a database of valid addresses, comparing the address from the source with the database of valid addresses, and storing selected information relating to the address in a companion file at the remote terminal if a match is found.

In still another embodiment, the invention is directed to a method of validating an address, comprising: receiving address data in a particular format; manipulating the data into a predetermined format corresponding to the particular format; comparing data in the predetermined format with valid addresses in the database; and presenting the results if one or more matches are found.

In another embodiment, the invention is directed to a method for importing one or more addresses from a database of addresses, where the database of addresses stores address data in a selected format. The method involves storing the one or more addresses at the database of addresses in the selected format; receiving the address data along with identification data to identify at least a characteristic of the database of addresses; processing the identification data; and processing the address data in a particular manner based on the identification data corresponding to the database of addresses.

In yet another embodiment, the invention is directed to a system for comparing a received address with a set of validated addresses. The system includes a remote device that maintains an internal address book in a particular data format. The remote device includes at least one address book provider that is operative to interact with an external address book, the provider being operative to access data in the external address book and to provide data relating to the database structure format of the external address book. The system also includes an address matching server that maintains a database containing the set of validated addresses. The address matching server is capable of communication with the remote device via a communication network, and is operative in response to receipt of the address data and the database structure format data from the remote device to process the address data, compare the processed data with the set of validated addresses, and transmit one or more matches to the remote device.

In still another embodiment, the invention is directed to a method of comparing a received address with a set of validated addresses, including identifying an address in an external address book; accessing corresponding address data in the external address book with an address book provider that is operative to interface with the external address book; checking the address data against a local companion file to determine whether the address is valid; and validating the address at an address matching server that maintains a database of valid addresses if the result of the check with the local companion file does not validate the address.

In another embodiment, the invention is directed to a method of comparing a received address with a set of validated addresses, including identifying an address in an external address book; accessing corresponding address data in the external address book with an address book provider; and validating the address at a remote address matching server that maintains a database of valid addresses.

In yet another embodiment, the invention is directed to a method of comparing a received address with a set of validated addresses, including identifying an address in an external address book; accessing corresponding address data in the external address book with an address book provider; and validating the address at a server that maintains a database of valid addresses, wherein validating comprises using one or more query permuters to process the address data.

BRIEF DESCRIPTION OF THE DRAWINGS

The objects, advantages and features of this invention will become more apparent from a consideration of the following detailed description and the drawings, in which:

FIG. 5 is a block diagram of the system of FIG. 1 and including plural external address book providers according to one illustrative embodiment of the invention;

FIG. 6 is a chart of various field names used by various external address books;

Figure 11:
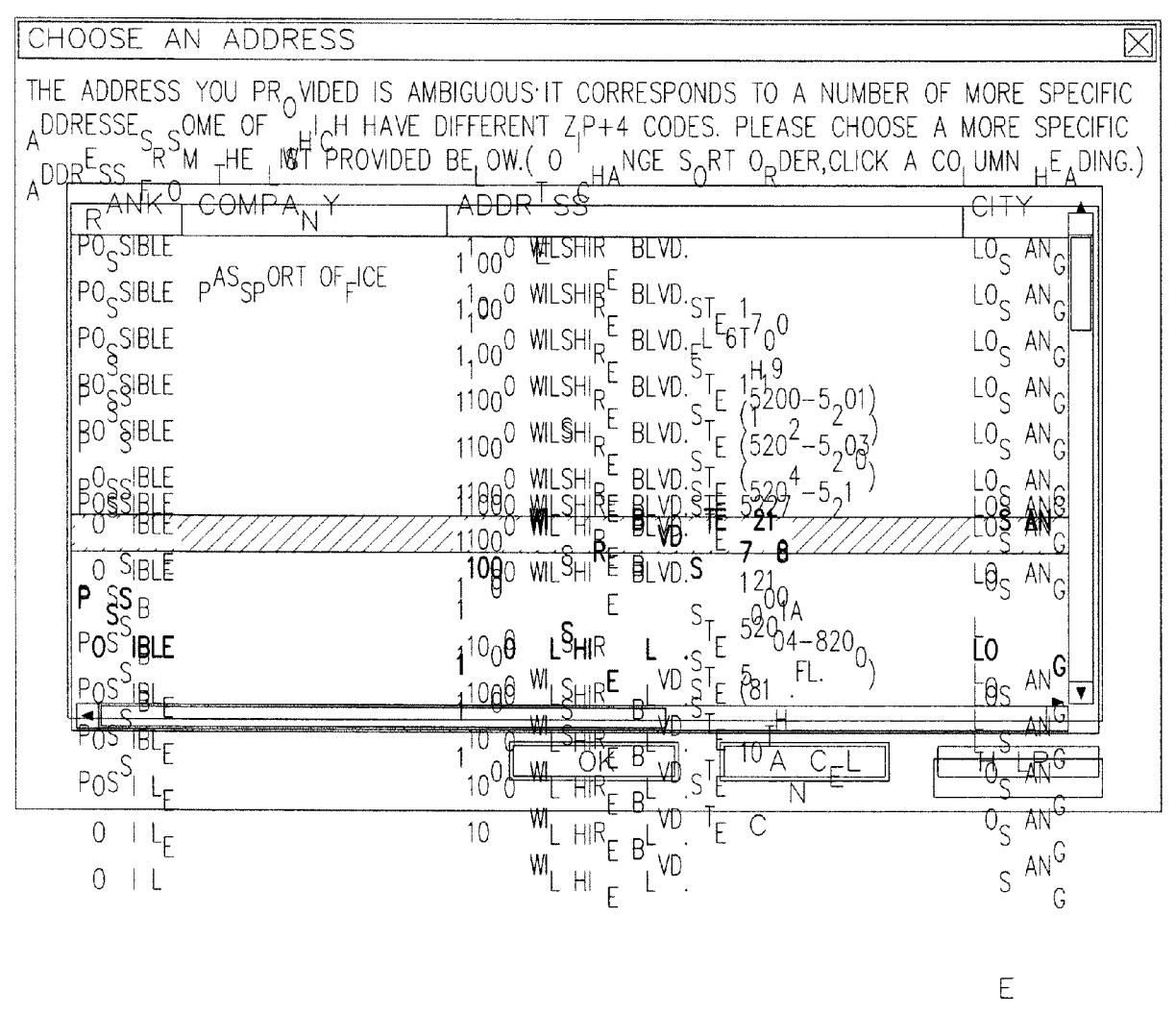

FIG. 11 is a screen shot of a typical user interface listing plural possible matches for an address validation request.

DETAILED DESCRIPTION OF PREFERRED EMBODIMENTS OF THE INVENTION

Figure 1:
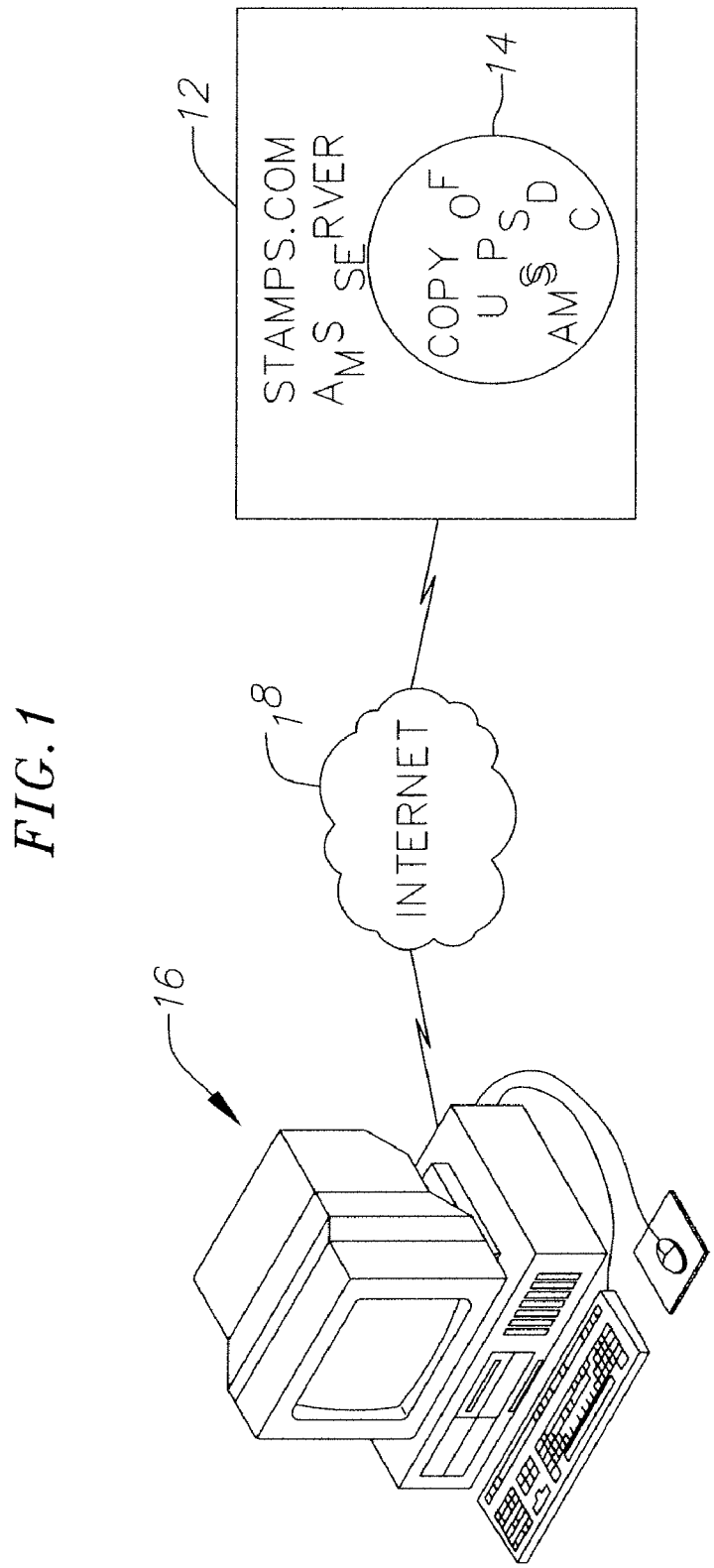
FIG. 1 is a simplified block diagram of a remote user terminal ("client") connected to an address matching server via a two-way communication network according to one embodiment of the present invention.

Referring now to FIG. 1, there is shown an address matching system 10 according to one illustrative embodiment of the invention. The address matching system 10 includes an address matching system (AMS) server 12 that maintains a database 14 of a set of validated addresses. The AMS server 12 communicates with one or more remote terminals 16 (hereinafter referred to as "clients"). While only one client 16 is shown in FIG. 1, it will be understood that the system 10 is capable of interaction with multiple clients through a suitable interface. The clients 16 and AMS server 12 engage in two-way communication over a suitable communication network 18. In one embodiment, communication network 18 comprises the Internet. It will be understood by those skilled in the art that the communication network may take many different forms, such as a local area network (LAN), wide area network (WAN), wired telephone network, wireless network, or any other network that supports data communication between respective entities.

The clients 16 may take many different forms, and in one illustrative embodiment comprise a personal computer and printer, with the personal computer in one embodiment being in communication with a PSD, either locally or over a communications network. Alternatively, the clients 16 may comprise computers or any other device that has processing capabilities and that may engage in communication over communication network 18. Other examples are wireless display devices, cellular telephones, and other mobile devices. The clients 16 are preferably programmed to provide functionality to allow users ("senders") to enter addresses in various format structures, and to compare those addresses with the database of valid addresses. The functionality of the clients 16 in verifying addresses is described in greater detail below in connection with FIGS. 2-4 and 9. The functionality of the client 16 and PSD in printing postage indicia in one illustrative embodiment is described in more detail in pending application Ser. No. 09/651,390, entitled "VIRTUAL PRINTING OF INDICIA, LOGOS AND GRAPHICS", filed on Aug. 29, 2000, the disclosure of which is hereby expressly incorporated by reference. An exemplary on-line system is described in U.S. patent application Ser. No. 09/163,993 filed Sep. 15, 1998, the entire contents of which are hereby expressly incorporated by reference.

AMS server 12 will typically be associated with a web site that is accessible by each client 16 using a suitable Uniform Resource Locator (URL) address or the like, and will maintain a database 14 of valid addresses, which is accessed by the server 12 in response to receipt of an address match request from a client 16, along with address data corresponding to the address that a sender at client 16 wishes to verify.

Figure 2:
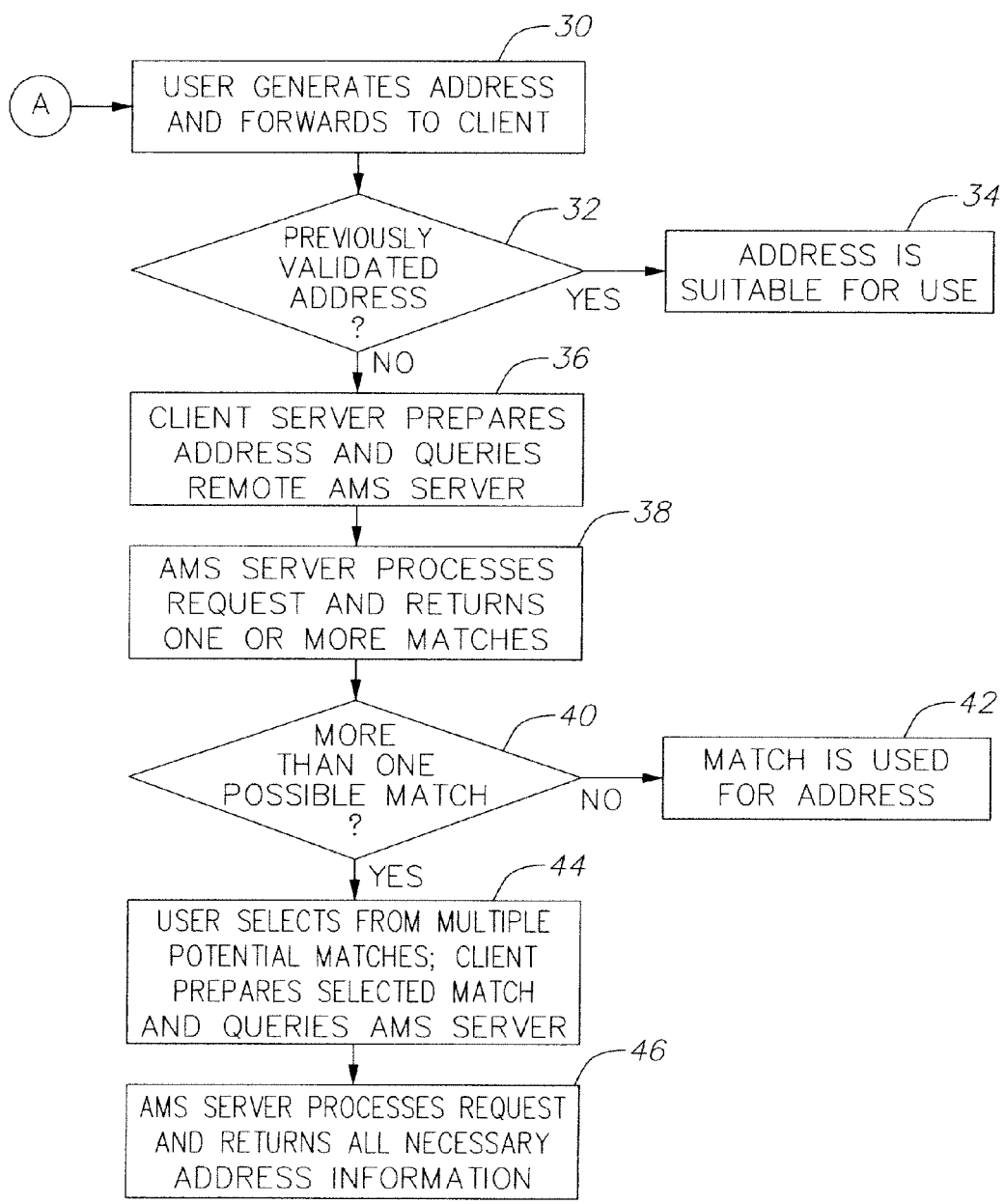
FIG. 2 is an exemplary flow diagram of an address matching routine according to one illustrative embodiment of the invention.
Figure 10:
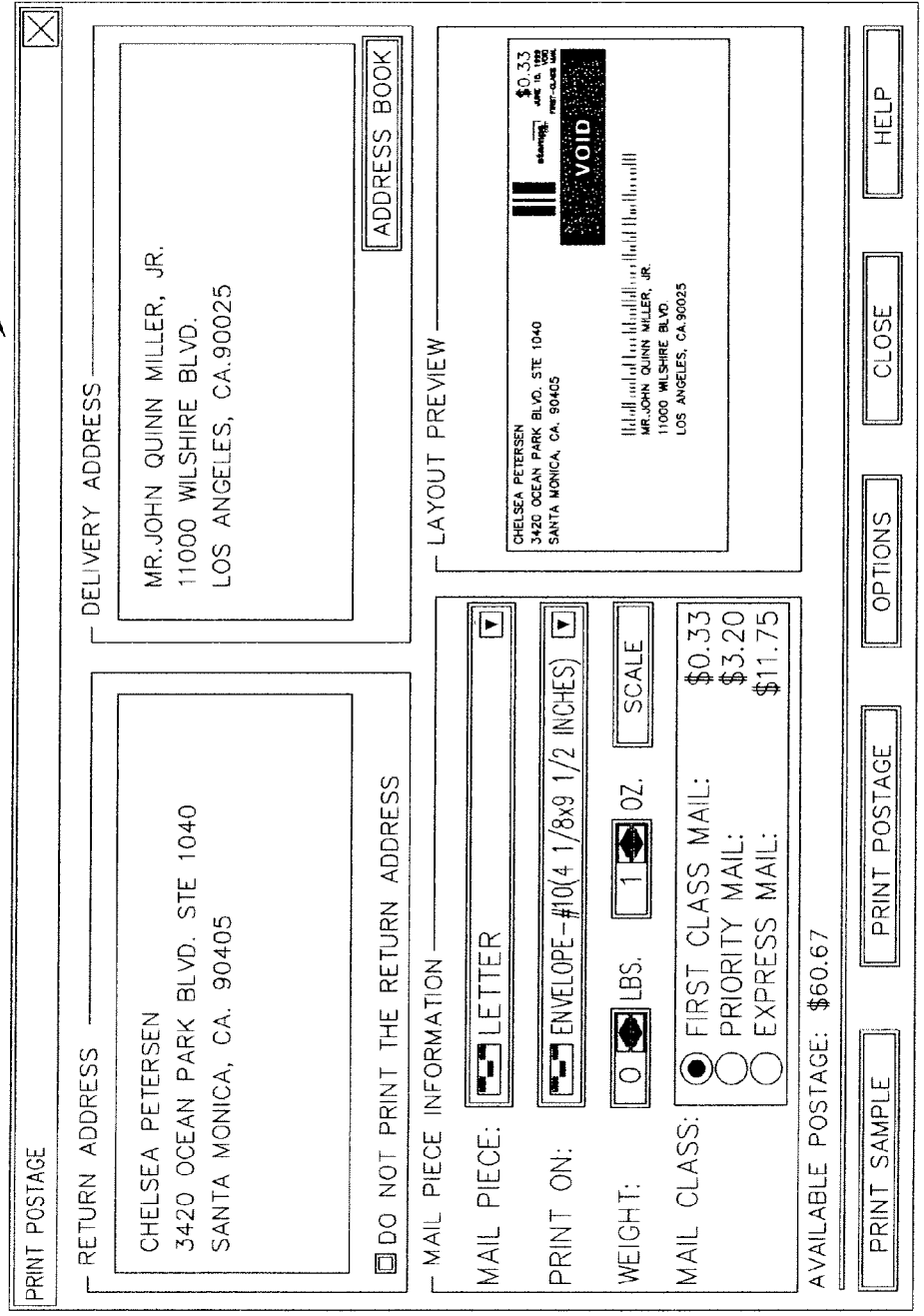
FIG. 10 is a screen shot of a suitable user interface to allow a user to enter address information in a free format.

Referring now to FIG. 2, the basic operation of the address matching system 10 is described in more detail. Operation begins at step 30, with a sender entering a destination address for a corresponding piece of mail into the associated client 16. FIG. 10 shows a suitable user interface 21 that client 16 may present to user for input of the pertinent shipping information. User interface 21 includes a pair of windows 22 into which the user may enter delivery and return addresses in a free form (i.e., without separating the address information into multiple fields). The user interface 21 also includes a number of windows 23 into which the user may enter postage information, as is well known in the art.

At query block 32, client 16 determines whether the address has been previously validated. In one embodiment, this is accomplished by accessing a companion file maintained by the client 16 that stores selected information relating to each address that has previously been validated, and by comparing the address data with the data stored in the companion file. This process is described in greater detail below in connection with FIG. 3.

If the address has been previously validated, then operation proceeds to step 34, and the address is suitable for use and client 16 may use the address in a postage meter procedure. On the other hand, if the address has riot been previously validated, then operation instead proceeds to step 36, and client 16 processes the address and then makes an address matching request to AMS server 12, along with the processed address data. Processing of the address data can take many different forms, as is described in greater detail below. An example of such processing is described below in connection with FIG. 9.

Operation then proceeds to step 36, and AMS server 12 compares the received address data with the data in database 14. As will be understood in the art, each record in database 14 will preferably consist of a plurality of elements (or fields), as will the received address data. Thus, AMS server 12 compares corresponding fields to determine whether one or more matches exists, and the results are transmitted to the requesting client 16 at step 38. The results are preferably presented to the user as a list, such as the list shown in FIG. 11.

As used herein, the term "match" does not require that the address data correspond identically to the data in database 14. Rather, a match (or at least a potential match) may be declared where there is a substantial similarity between the address data and the data in one or more records. As is well known in the art, a match can be declared when the two sets of data exceed some preset threshold. For example, a match can be declared where each field exceeds some preset threshold. Alternatively, a match can be declared where certain of the fields match identically (such as the field that contains the city data) and where the other fields exceed some threshold matching value. Thus, it will be understood that a match can be declared in many different ways.

Operation then proceeds to query block 40, and client 16 determines whether there are more than one match in the results. If not, then operation proceeds to step 42, and the matched address may then be used by the client 16 in a postage meter procedure.

If, on the other hand, the AMS server 12 returned more than one potential match, then operation proceeds to step 44, and the sender selects one of the potential addresses. Client 16 then prepares an address match request with the address data from the selected address. The query is transmitted to AMS server 12. At step 46, AMS server 12 processes the request, and transmits all necessary information relating to the single address to client 16, which may then use the address in a postage meter procedure. Operation then terminates.

In one embodiment, at step 46 the AMS server 12 employs an address filter to ensure that only a single address is returned to client 16 (i.e., in a match address single query). The filter only allows an address that exactly matches the input address to proceed to client 16. If there is no exact match, then the filter blocks all addresses except for a default address, as determined by server 12. When the filter analyzes a returned range-based address, it initially determines whether the contents of that result, aside from the range, match the corresponding contents in the original input address. If so, the filter determines whether the ranged value lies within the range in the result address. If so, then the filter considers the address identical and server 12 passes the address back to client 16.

On the other hand, if the contents of the result, aside from the range, do not match the corresponding contents in the original input address, then the filter only passes a default address.

When the server 12 returns the results to client 16, some of the addresses may contain ranges (e.g., 100 Main Street Suite 100-105). If that address is the one selected by the user, client 16 then requires user to select the correct number from the range (e.g., Suite 102). That address is then transmitted back to server 12 for cleansing and validation. For this query, client 16 utilizes at "Matching Address Single" query for validation, and the results ensures a return of a Delivery Point Bar Code (DPBC) value. The "Matching Address Single" query is described in greater detail below.

In one embodiment, AMS server 12 returns the results of an address validation along with a result code to indicate to client 16 the outcome of the validation process. For example, the result code may indicate that the input address 1) is valid, 2) is corrected, 3) was not found, 4) has multiple potential matches, 5) includes an invalid number or street, 6) includes an invalid city, 7) includes an invalid state, 8) includes an invalid ZIP code, and the like. The result code may then be used by client 16 accordingly.

In this manner, system 10 provides a server-based address matching system that does not require each user to maintain a database of validated addresses. As the set of validated addresses changes, only the central database 14 at server 12 requires updating. Each individual client 16 need not update any list in their respective memories. In this manner, system 10 ensures that addresses may be properly validated as soon as database 14 is modified. There is no need to rely upon each individual user at each client 16 to update the respective machines.

As described above, each client 16 preferably maintains one or more companion files (e.g., data files, a database, or any other suitable storage location in a memory) to which is saved selected data for each validated address. In one embodiment, the records in the companion file are purged when the client 16 software determines that the record expiration date has expired, thereby requiring that the previously validated addresses be validated again. In another embodiment, each record includes an associated expiration date, so that client 16 may determine whether the record is valid or whether it has expired, such that the address must be validated through AMS server 12.

In one illustrative embodiment, client 16 maintains a companion file for each address book with which client 16 interacts; Thus, client 16 maintains a companion file for its own internal address book, and plural companion files for respective external address books, as is described in more detail below. Each address book generates a unique address identity for each address record. The address identity data is stored in the companion file as a data record. In one embodiment, each record in the companion file also includes a plurality of data members, including: 1) ZIP code, 2) Address Hash, 3) Address Hash Size, 4) Address Identity, 5) Expiration date, and 6) Archive Version. The ZIP code is preferably the full twelve-digit ZIP code (ZIP plus add-on plus delivery point plus check digit), or the five-digit ZIP code if the AMS server 12 did not assign an add-on to the validated address.

The Address Hash is the hash value for the last two printed lines (all in upper case) of the address when it was validated. As is well known in the art, a hash value is a number generated from a string of text. The hash value is substantially smaller than the text itself, and is generated by a formula in such a way that it is extremely unlikely that some other text will produce the same hash value. The Address Hash size is the actual size, in bytes, of the Address Hash value.

The Address Identity data member is a key that uniquely identifies the address to which the companion record corresponds in an address book database, to associate the address in an address book with the companion record in the companion file for that address book. As described above, client 16 preferably maintains a companion file for each address book.

The Expiration date, in one embodiment, corresponds to the expiration date of the AMS database used to cleanse the address. The AMS server 12 provides this date as part of the output of each address matching transaction. The expiration date is the date at which the address validation expires for the corresponding record. After that date, the address is no longer considered valid, even if the user has not altered it and the hash values match.

The Archive Version is a version number for the respective record format. If a change is made to the companion record format, the software can identify "old" records and "new" records based on the Archive Version information, which is used to ease future changes to the format of companion file records. In one embodiment, the Archive Version number is used in conjunction with the Microsoft® Foundation Classes object serialization feature (which is used to read and write companion files).

Figure 3:
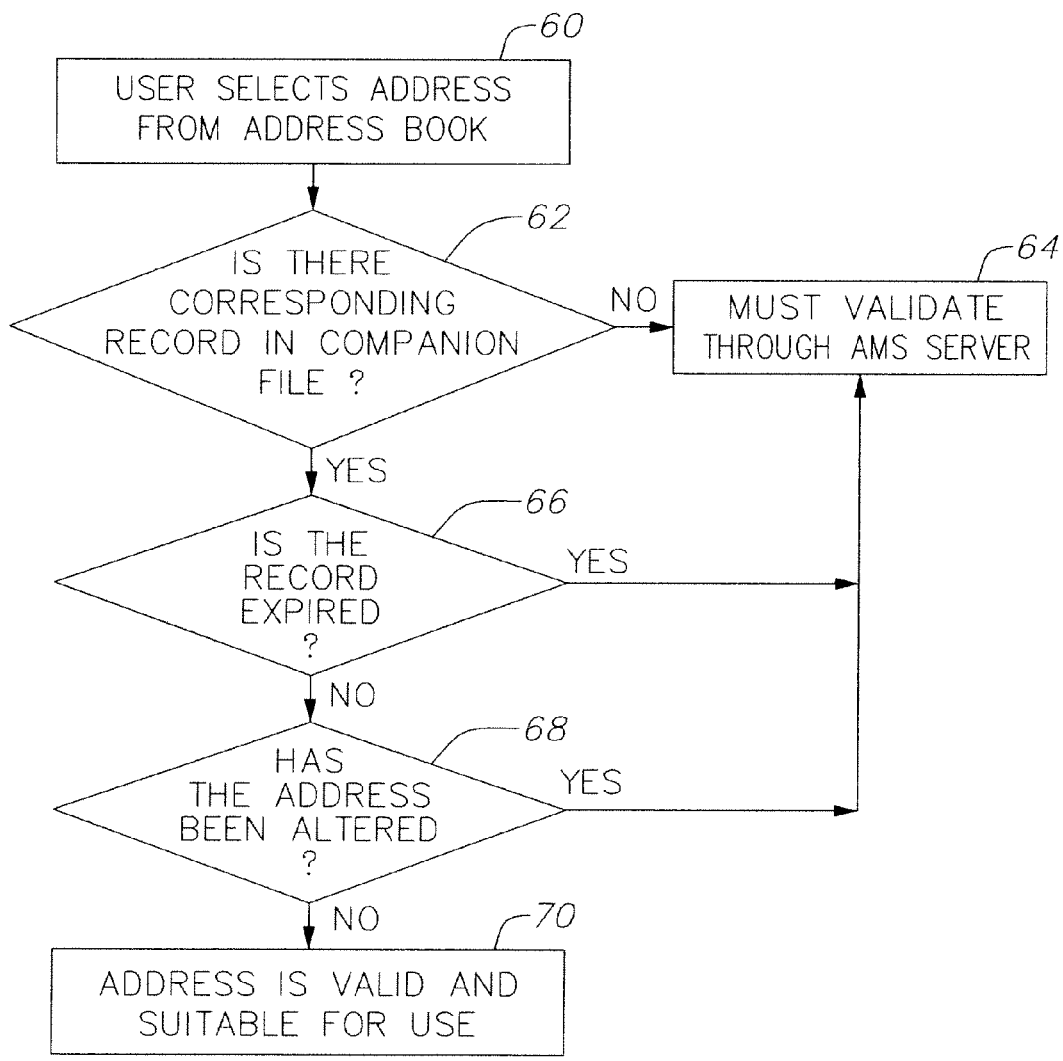
FIG. 3 is an exemplary flow diagram of an address comparison routine according to one illustrative embodiment of the invention.

Referring now to FIG. 3, operation of system 10, and in particular client 16, in connection with validating an address from an address book is described in more detail. Operation begins at step 60, with the user selecting a desired destination address from an address book at client 16. At query block 62, client 16 determines whether there is a corresponding record in the companion file for the selected address. In one embodiment, this is accomplished by accessing the Address Identity values in the companion file to determine whether there is an associated record for the selected address. If not, operation proceeds to step 64, and the selected address must be validated through AMS server 12. System 10 then proceeds through the process shown in FIG. 2 and described above.

On the other hand, if there is an associated record in the companion file, the operation proceeds to query block 66, and client 16 determines whether the record in the companion file is expired, for example, by reviewing the Expiration date data member stored in the companion file record. If the record has expired, then the record is stale and operation proceeds to step 64. If the record is instead extant, then operation proceeds to query block 68, and client 16 determines whether the address has been altered by the user.

Preferably, this is accomplished by comparing hash values for the selected address and the record in the companion file. In one embodiment, the hash value is generated from the last two lines of the address (e.g., street and city/state/ZIP), and the hash value is compared to the recorded hash value in the record. If the hash values match, then operation proceeds to step 70, and the selected address is still valid. If the hash values do not match, then operation proceeds to step 64, and the address must be validated through AMS server 12.

In one embodiment, each client 16 maintains an internal address book (i.e., a data file) that contains address records stored in a preselected format. For example, the address book may include the following element fields for each record, in a specific order: Name, Title, Street Address, City, State, and Zip Code. This order is the internal canonical schema supported by system 10.

System 10 also provides software resident at each client 16 that allows for the importation of address data from various third-party address books into the address book maintained by client 16. In one illustrative embodiment, client 16 maintains a plurality of address book providers 15 (FIG. 5), with each provider 15 being operative to interface with a corresponding external address book application. In another embodiment, for example, in the case of address books that do not have an associated provider 15, the importation of addresses relies on comma-separated value (CSV) files. As is understood by those skilled in the art, many software applications can generate CSV files that contain data in fields separated by commas.

Figure 4:
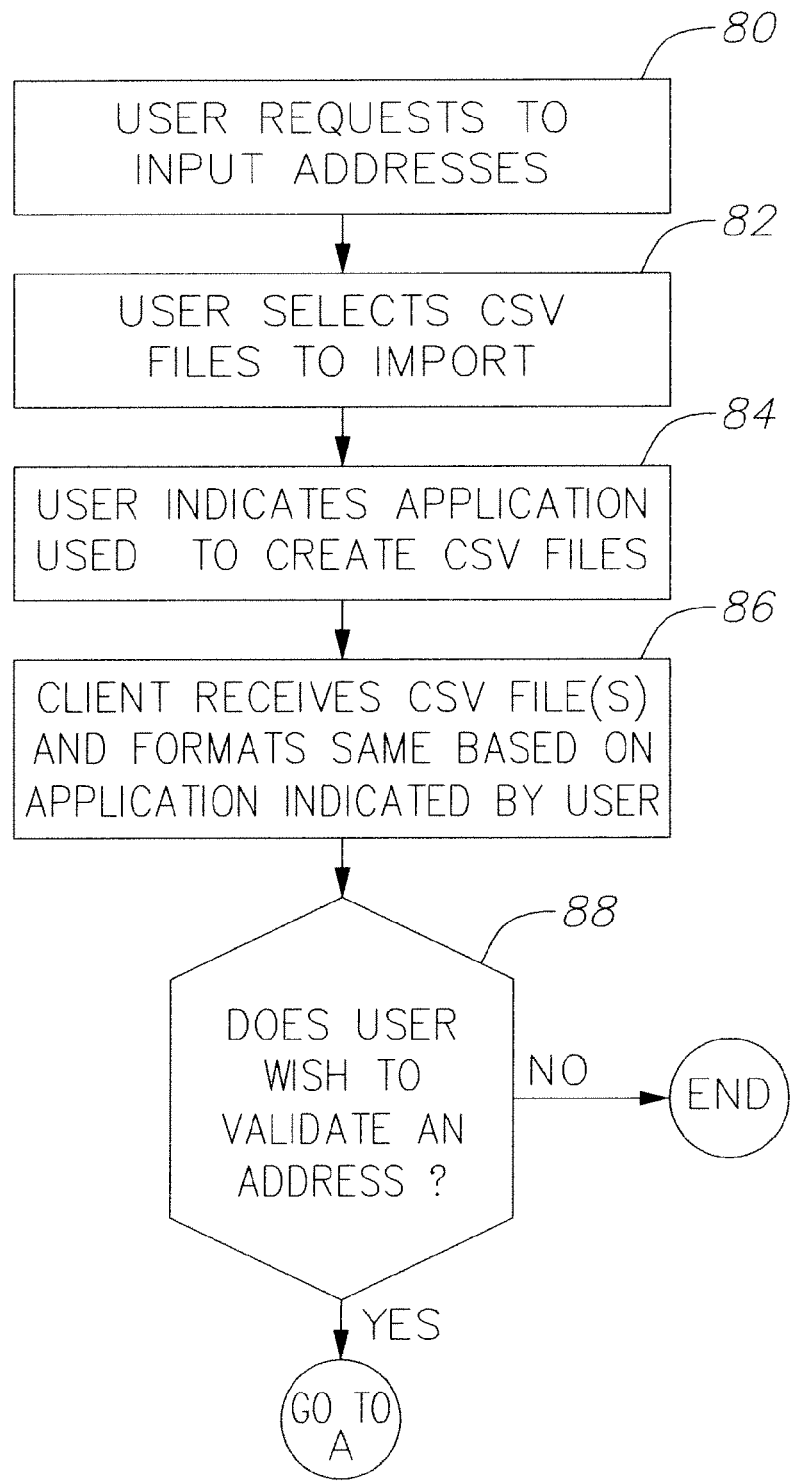
FIG. 4 is an address importing routine according to one illustrative embodiment of the invention.

Operation of the system 10 in importing CSV files is now described in connection with FIG. 4. Operation commences at step 80, with a user at client 16 requesting to import one or more addresses from a third-party address book. At step 82, the user selects the CSV file(s) to import from a list of CSV files stored in memory, or in any other suitable manner. Client 16 then prompts the user to select the address book application used to store the CSV file, and at step 84 the user enters such information. Client 16 maintains a set of data corresponding to field types and field sequence for each address book application. For example, one address book application may designate five fields for each address record in a selected order, such as name, organization, street address, city and state, and ZIP code. Another address book application may include the name and organization in one field, and separate the city and state into different fields. Thus, client 16 is preferably programmed with such information for various address book applications.

Operation then proceeds to step 86, and client 16 receives the CSV file(s) from the file system, and also retrieves the appropriate format information based on the address book application identified by the user. Client 16 then parses through the data in the CSV file(s), reading the data for the respective fields and inserting the data into a format that is supported by client 16 and that is suitable for storage in the native address book database of system 10. As is known in the art, the USPS address matching service supports a particular schema format (FIG. 7), in which the first field contains data relating to Address Line 1 (e.g., street address), the second field contains data relating to Address Line 2 (e.g., Post Office Box number) and a firm or organization name, the third field contains data relating to the city, the fourth field contains data relating to the state, and the fifth field contains data relating to the ZIP code.

Thus, client 16 determines, based on the address book application used to create the address record, which portion of the CSV data maps to the native address book database supported by system 10. Then, this data is mapped to canonical fields as all other address book databases are accessed through the respective address book providers, as is described in more detail below.

Operation then proceeds to query block 88, and client 16 determines whether the user wishes to validate one or more of the addresses via AMS server 12. If so, then system 10 performs the validation process as is described above in connection with FIG. 2. If not, then operation terminates.

If the user wishes to validate an address, client 16 determines whether a match has been found for each address that the user wishes to validate. As described above, the validation process may include transmitting a list of potential matches to client 16 for display to the user, and then allowing the user to select from that list to create a match. If a match is found, the address data is added to the address book maintained by client 16, and information relating to the matched address is stored in the companion file, as described above.

As described in more detail, below, when client 16 is provided with a list of potential address matches, the user then may select one of the addresses from the list. Once the user selects one of the addresses, server 12 is queried again using one or more permuters, as are described in more detail below. Server 12 then returns a validated, cleansed address that is stored in the appropriate address book, and the appropriate updates are made to the corresponding companion file.

Figure 12:
FIG. 12 is a screen shot of a suitable user interface to allow a user to enter address information in a structured format.
Figure 1:
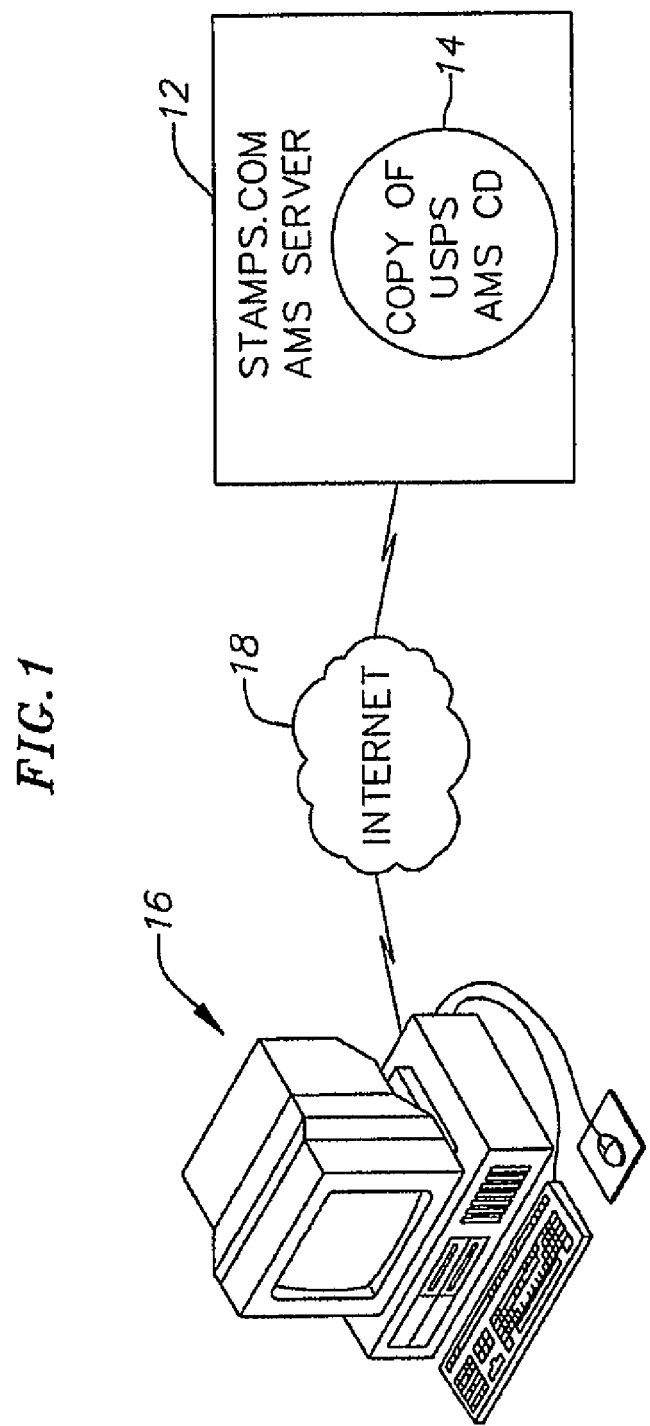

On the other hand, if there are no matches found for one or more of the addresses, client 16 determines whether the user wishes to correct the address information for the unapproved address or addresses, by displaying a suitable graphic on the screen and allowing the user to decide whether to correct the address(es) or not. If not, then the non-approved address data is discarded. If the user does wish to correct an address, then client 16 receives such information from the user. In one embodiment, client 16 displays a suitable graphic with plural fields (windows) into which the user may enter or modify data, as is shown in FIG. 12. Once the user has entered the changes, client 16 once again attempts to validate the address via AMS server 12.

Referring now to FIG. 5, there is shown another illustrative embodiment of system 10. In this embodiment, system 10 maintains one or more external address book application programming interface (API) providers 15 (hereinafter "address book providers"). Each address book provider 15 is designed to natively support a corresponding external address book, such that the address data at each external address book need not be stored in CSV (or some other) format prior to introduction to client 16. In one illustrative embodiment, the address book providers 15 are COM components that are installed by client 16. For example, one or more of the address book providers 15 are built on Extended Systems' Harmony translator API that enables direct address book database traversal. Other providers 15 may be based on Messaging Application Programming Interface (MAPI) protocol. When each address book provider 15 is installed, the provider registers in a suitable registry, such as Windows registry, using the COM category API.

Each address book provider 15 is designed to interface between the client address book component 15 and the respective external address book component 17, which allows for dynamically modifying data in the corresponding address book, without the need for making a copy of the data contained in the external address book. Each provider 15 allows access to the database or databases of the respective external address book, and provides the mechanism for translating, in both directions, between the external address book's database structure and the internal canonical schema of system 10 (e.g., data or other instructions that serve to identify the pertinent characteristics of the external address book). This then allows for entering addresses through system 10, and writing them to an external address book 17, or reading address data from one or more external address books 17 and processing the address data at server 12 to map the address data into a data structure that has the appropriate format for comparison with the set of validated addresses maintained by server 12.

When an address book provider 15 is loaded, it reports its schema representation to client 16, and for each field in its schema, the provider communicates 1) the name of the field, 2) a canonical field name to which the field is mapped, 3) data type (e.g., string), 4) data size, and 5) attributes of that field. Thus, when address data is read from a particular address book and such data is made available to client 16, client 16 may pass that information on to server 12, along with schema representation information to server 12, so that server 12 may intelligently process the incoming address data.

The internal address book component 19 of client 16 provides a canonical schema into which the addresses from the respective external address books are formatted. The canonical schema is the symbolic representation of all postal address fields that are encountered in the respective external address books. These fields identify the semantics of the postal fields used for a particular address book. FIG. 6 depicts the canonical field names encountered for various address books.

As described above, client 16 transmits an address validation request to AMS server 12, along with the address data in a format that is compatible with the internal canonical schema. However, it will be understood by those skilled in the art that a match may still be hard to obtain in the first stage, because of different formats that AMS server 12 must attempt to map to the USPS-supported format.

In order to increase the likelihood of obtaining one or more matches, system 10 provides a set of query permutations to configure the input address in various formats to enhance the likelihood of obtaining one or more matches. In one illustrative embodiment, system 10 utilizes three different permuting techniques to map different schema formats to the USPS-supported schema, namely a direct permuter, a single line permuter, and a truncate permuter. Thus, a structured address is processed, prior to transmission to AMS server 12, using the three permuters to increase the chance of finding a match for the address. Each permuter attempts to map the available input fields to the USPS-supported schema, but with a slightly different form. It will be understood that more or less permuters can be used.

Figure 7:
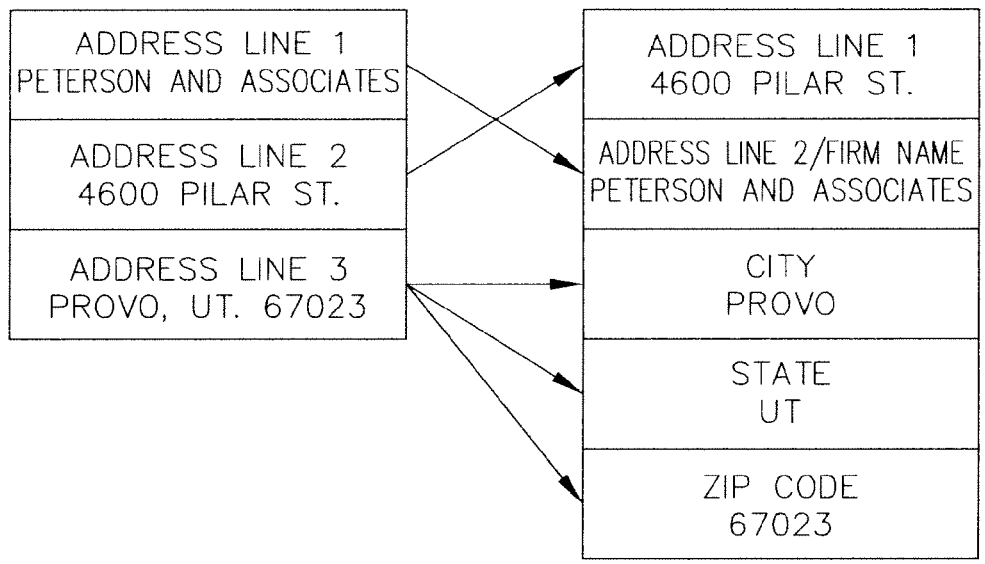
FIG. 7 is a schematic depiction of a direct permutation process to transform an input address format into a USPS-supported schema.

The direct permuter directly maps the input data to the USPS-supported schema. FIG. 7 schematically shows a direct permutation process performed on an address record consisting of three address line fields, in which the order of the first and second fields is switched, and the third field (Address Line 3) is mapped to respective City, State, and ZIP code fields in the internal canonical schema of system 10.

Figure 8:
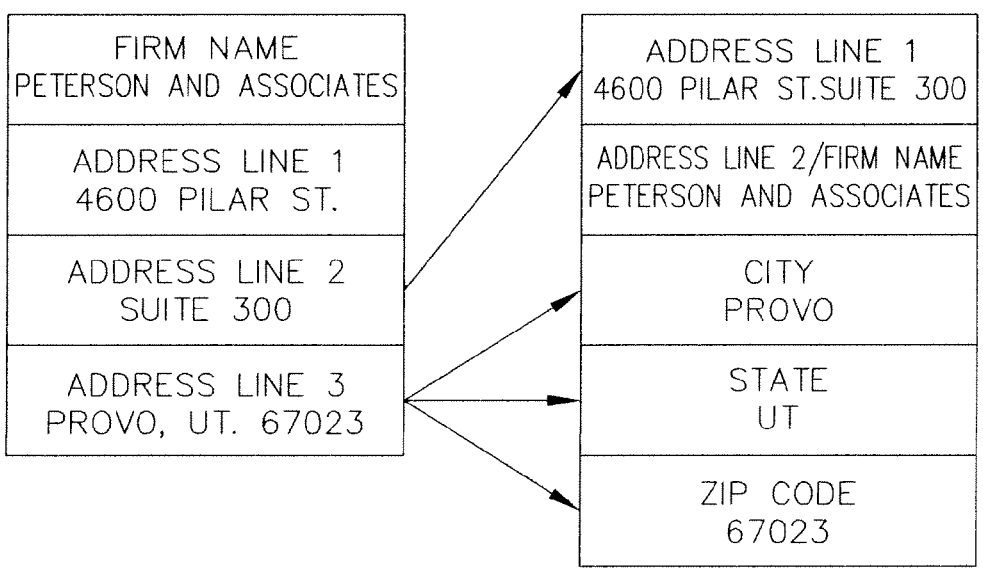
FIG. 8 is a schematic depiction of a single-line permutation process to transform an input address format into a USPS-supported schema.

The single line permuter is used when the street address information is not contained on a single line, for example, when the suite number is on its own line. The single line permuter appends the Address Line 2 data to Address Line 1 to create a single line for street address data. FIG. 8 schematically shows such a permutation process.

Figure 9:
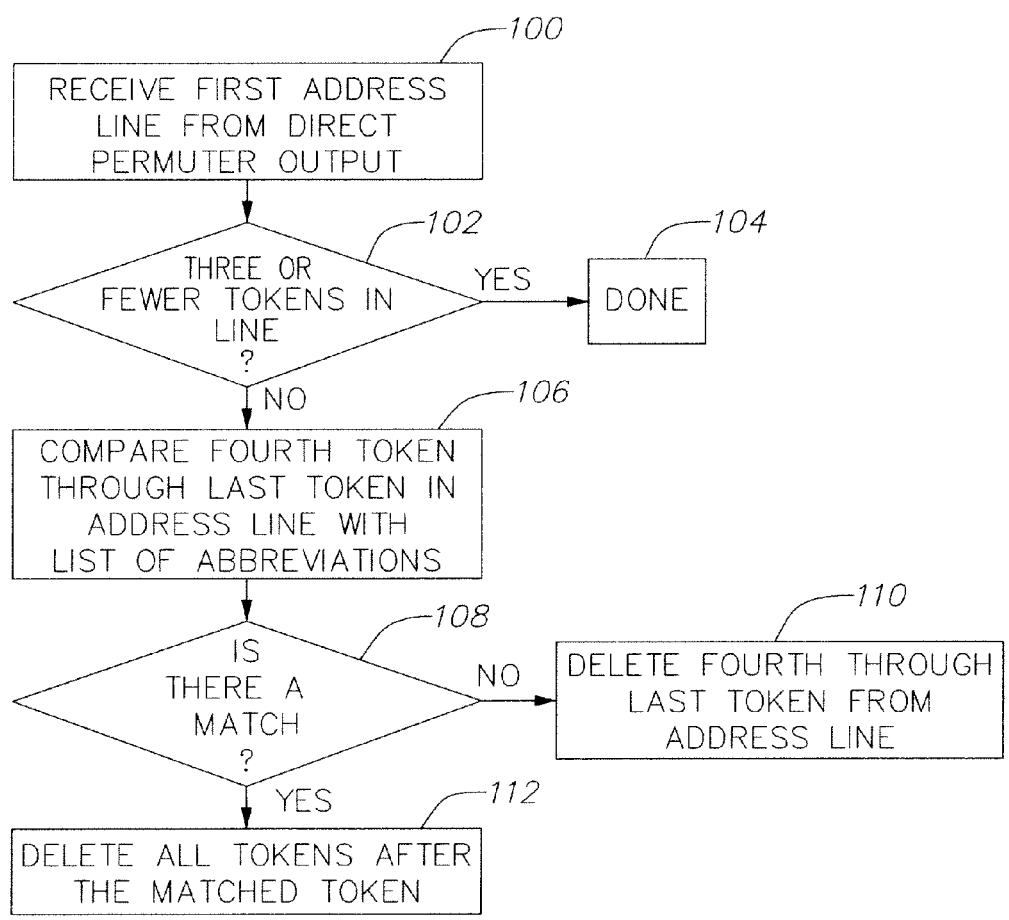
FIG. 9 is a flow chart depicting the operational flow of a truncate permutation process to transform a portion of a direct permutation output into a new format.

The truncate permuter receives the direct permuter output and analyzes the first address line to determine whether to modify the data in that line. FIG. 9 is a flow chart showing the process steps of the truncate permuter. Operation begins at step 100, and the first address line from the direct permuter output is taken. At query block 102, client 16 determines whether there are three or fewer tokens in the address line. As used herein, a "token" is defined as an element that is separated from other elements by commas, periods, tabs, spaces, apostrophes, quotes, colons, or semicolons.

If there are three or fewer tokens in the line, then operation proceeds to step 104, and the truncate permuter does not modify the address line, and operation ends. On the other hand, if there are more than three tokens in the address line, then operation instead proceeds to step 106, and client 16 compares the fourth through last tokens in the address line with a list of common abbreviations. For example, the address line may be "123 South Main St.". The fourth token is "St", which is found in the list of common abbreviations. The list of common abbreviations will also include other well-known abbreviations, such as "Ave", "Blvd", "NW", "SW", and the like.

Then, at query block 108, client 16 determines whether there is a match. If not, operation proceeds to step 110, and only the first three tokens are kept, and the fourth through last tokens are deleted from the address line. If there is a match in one of the fourth through last tokens, then operation instead proceeds to step 112, and all tokens after the matched token are dropped. For example, "123 South Main St. Harbor Marina" becomes "123 South Main St.". This modified address is then added to the ordered, permuted address list for validation at AMS server 12.

As described above, each external address book has its own unique set of fields, some of which are not mapped to the USPS-supported schema. The data in those fields is preferably saved by AMS server 12 in memory during the permutation and address validation process. Then, when a validated address is returned to client 16, the data is reincorporated into the final address. For example, the external address book may have fields for Title and Department, which are not contained in the USPS-supported schema. Thus, the data in those fields is removed during the conversion into the USPS-supported schema. Once a valid address is returned, the data is reincorporated into the address that is presented to the user.

Typically, when multiple matches are returned to client 16, the results do not include Delivery Point Bar Code (DPBC) values. Thus, when a user selects one of the addresses, a second query is transmitted to AMS server 12 to retrieve all necessary information concerning the selected address, including a DPBC value. In another embodiment, AMS server 12 is programmed to return a DPBC value for each output address transmitted to client 16. In yet another embodiment, AMS server 12 compares the input 9-digit ZIP code with the ZIP code of each output address. For each output address whose ZIP code matches the input ZIP code, the DPBC value is retrieved and transmitted for each output address.

In one embodiment, system 10 ranks each of the potential matches according to the following criteria: 1) when only a single address is returned, no ranking is necessary; 2) all multiple addresses are returned with a default ranking of "possible"; 3) addresses that match the firm name or ZIP code are ranked as "better". Ranking is preferably performed by a series of conventional ranking agents, such as those that determine if an address matches the input address Firm Name or ZIP code.

From the foregoing, it will be apparent to those skilled in the art that the system and method of the present invention provide for validating addresses through a central server. The system and method also provide novel techniques for improving the outcome of such address validating procedures.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A method for matching an address with a database of pre-approved addresses for printing on a value bearing item (VBI), the method comprising:

storing a plurality of pre-approved addresses with a predetermined format in the database;

receiving address data with different formats;

mapping the received address data with the different formats into the predetermined format;

comparing the received address data in the predetermined format to the pre-approved addresses in the database for validating the received address data;

displaying a list of potential matches for selection by a user;

selecting a match from the list of potential matches;

sending a request to the database for address information corresponding to the selected match;

receiving address information; and printing the received address information on the VBI.

2. The method of claim 1, wherein comparing data in the predetermined format with valid addresses in the database comprises accessing a remote database of addresses over a communication network.

3. The method of claim 2, wherein the database is maintained by a remote address matching server.

4. The method of claim 1, wherein the mapping comprises applying a plurality of query permuters to the address data to convert the address data into respective formats.

5. The method of claim 4, wherein applying a plurality of query permuters comprises applying at least one of a direct permuter and a single line permuter to the address data.

6. The method of claim 5, wherein applying further comprises applying a truncate permuter to the output structure of the direct permuter.

7. A method for validating an address for printing on a value bearing item (VBI), the method comprising:

storing a plurality of pre-approved addresses in a database;

receiving the address from a user using a terminal remote from the database over a wide area network;

accessing the database from a server that is communicating with the terminal over the wide area network;

comparing the address received from the remote terminal to the database of pre-approved addresses;

transmitting a list of potential matches to the remote terminal;

displaying the transmitted list of potential matches on the remote terminal;

selecting a match from the displayed list of potential matches;

sending a request to the server for address information corresponding to the selected match;

receiving address information; and printing the received address information on the VBI.

8. The method of claim 7, further comprising storing address information in a companion file upon a validation of the address.

9. The method of claim 7, wherein receiving the address comprises importing the address from a database of addresses.

10. The method of claim 8, further comprising:
receiving a second address from the user;
comparing selected information from the second address with stored information in the companion file;
approving the second address for use if the selected information corresponds with the stored information in the companion file; and
accessing the database if no match is found.

11. The method of claim 10, wherein comparing the second address with the stored addresses in the companion file comprises determining whether a stored address in the companion file is stale, and rejecting the stored address if it is stale.

* * * * *

UNITED STATES PATENT AND TRADEMARK OFFICE
CERTIFICATE OF CORRECTION

| | |
|---|---|
| PATENT NO. | : 7,236,970 B1 |
| APPLICATION NO. | : 09/692031 |
| DATED | : June 26, 2007 |
| INVENTOR(S) | : Winslow |

It is certified that error appears in the above-identified patent and that said Letters Patent is hereby corrected as shown below:

In the Drawings

FIG. 1, Sheet 1 of 1      Delete Drawing Sheet 1 and substitute therefore the Drawing Sheet, consisting of Fig. 1, as shown on the attached page FIG. 5, Sheet 5 of 11      Delete Drawing Sheet 5 and substitute therefore the Drawing Sheet, consisting of Fig. 5, as shown on the attached page FIG. 11, Sheet 10 of 11      Delete Drawing Sheet 10 and substitute therefore the Drawing Sheet, consisting of Fig. 11, as shown on the attached page Signed and Sealed this First Day of January, 2008

JON W. DUDAS
*Director of the United States Patent and Trademark Office*

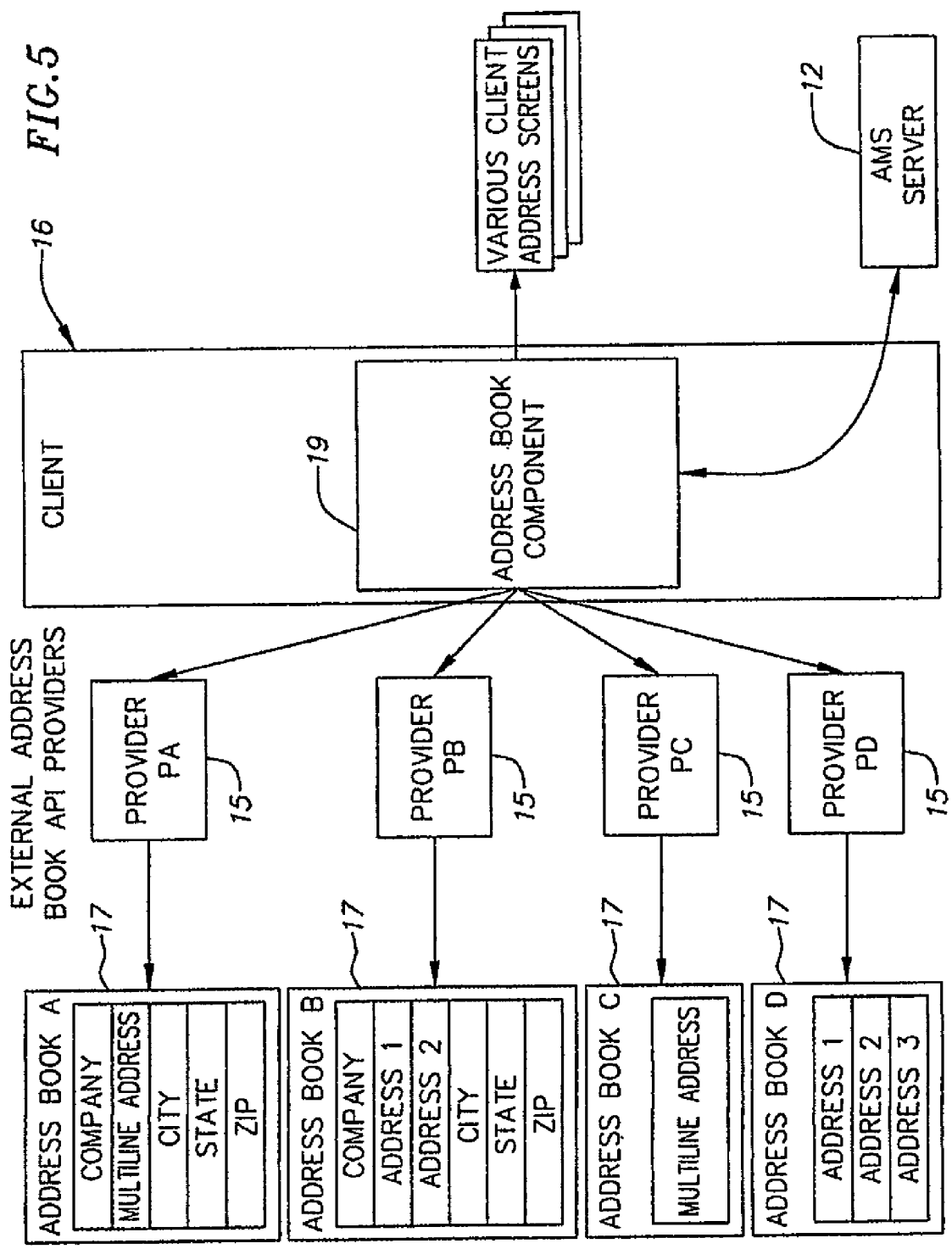

FIG. 11

CHOOSE AN ADDRESS

THE ADDRESS YOU PROVIDED IS AMBIGUOUS: IT CORRESPONDS TO A NUMBER OF MORE SPECIFIC ADDRESSES SOME OF WHICH HAVE DIFFERENT ZIP+4 CODES. PLEASE CHOOSE A MORE SPECIFIC ADDRESS FROM THE LIST PROVIDED BELOW. (TO CHANGE SORT ORDER, CLICK A COLUMN HEADING.)

| RANK | COMPANY | ADDRESS | CITY |
|---|---|---|---|
| POSSIBLE | PASSPORT OFFICE | 11000 WILSHIRE BLVD. | LOS ANG |
| POSSIBLE | | 11000 WILSHIRE BLVD. | LOS ANG |
| POSSIBLE | | 11000 WILSHIRE BLVD.STE 1700 | LOS ANG |
| POSSIBLE | | 11000 WILSHIRE BLVD.FL 6TH. | LOS ANG |
| POSSIBLE | | 11000 WILSHIRE BLVD.STE 1119 | LOS ANG |
| POSSIBLE | | 11000 WILSHIRE BLVD.STE (5200-5201) | LOS ANG |
| POSSIBLE | | 11000 WILSHIRE BLVD.STE (5202-5203) | LOS ANG |
| POSSIBLE | | 11000 WILSHIRE BLVD.STE (5204-5210) | LOS ANG |
| POSSIBLE | | 11000 WILSHIRE BLVD.STE 5227 | LOS ANG |
| POSSIBLE | | 11000 WILSHIRE BLVD.STE 7218 | LOS ANG |
| POSSIBLE | | 11000 WILSHIRE BLVD.STE 1000 | LOS ANG |
| POSSIBLE | | 11000 WILSHIRE BLVD.STE 5210 | LOS ANG |
| POSSIBLE | | 11000 WILSHIRE BLVD.STE 5201A | LOS ANG |
| POSSIBLE | | 11000 WILSHIRE BLVD.STE (8104-8200) | LOS ANG |
| POSSIBLE | | 11000 WILSHIRE BLVD.STE 10TH.FL. | LOS ANG |

[OK] [CANCEL] [HELP]